United States Patent [19]
> Currer

[11] 4,432,258
[45] Feb. 21, 1984

[54] CONTROLLABLE TOOL FEEDING APPARATUS

[75] Inventor: John T. Currer, Wauwatosa, Wis.

[73] Assignee: Kearney & Trecker Corporation, West Allis, Wis.

[21] Appl. No.: 296,501

[22] Filed: Aug. 26, 1981

[51] Int. Cl.³ .............................................. B23B 3/26
[52] U.S. Cl. ........................................ 82/1.2; 82/1.4; 82/2 E
[58] Field of Search ........................... 82/1.2, 1.4, 2 E; 408/158, 159, 173, 238, 239 R, 240; 409/230, 231, 232, 190, 191; 29/568

[56] References Cited

U.S. PATENT DOCUMENTS

| | | | |
|---|---|---|---|
| 2,325,294 | 7/1943 | Woytych | 82/1 |
| 2,383,050 | 8/1945 | Esson | 82/1.4 |
| 2,486,977 | 11/1949 | Peter | 82/2 |
| 3,025,729 | 3/1962 | Heuser | 82/1.2 |
| 3,113,475 | 12/1963 | Lombardo | 82/1.2 |
| 3,237,486 | 3/1966 | Gilbert et al. | 77/1 |
| 3,311,003 | 3/1967 | Daugherty | 408/152 |
| 3,422,705 | 1/1969 | Nahodk et al. | 82/1.2 |
| 3,824,883 | 7/1974 | Wloszek | 82/1.2 |
| 3,902,386 | 9/1975 | Dressler et al. | 82/1.4 |
| 4,040,315 | 8/1977 | Bellingham | 82/2 E |
| 4,354,305 | 10/1982 | Plummer et al. | 82/1.4 |

*Primary Examiner*—Leonidas Vlachos
*Assistant Examiner*—Jerry Kearns
*Attorney, Agent, or Firm*—Quarles & Brady

[57] ABSTRACT

A tool feeding head is provided, which is adapted for rapid attachment to and detachment from a machine spindlehead. The head includes a shaft which is joinable to a machine spindle of the spindlehead for coupling rotary driving motion from the spindle to either a crossfeed or feed-out cutting tool, the shaft being provided with a bore. An actuating rod is mounted in the bore for engaging the tool, the actuating rod feeding the tool when the actuating rod is reciprocated within the bore by a rod reciprocating mechanism. A system or device for controllably driving the rod reciprocating mechanism is immovably fixed to the machine spindlehead, the driving system operating the rod reciprocating mechanism to cause the actuating rod to feed the selected tool at a prespecified rate. Structure supporting the shaft and the reciprocating mechanism enables an automatic tool changer to selectively join the shaft to the spindle, and place the rod reciprocating mechanism in operative relationship with the driving system.

1 Claim, 8 Drawing Figures

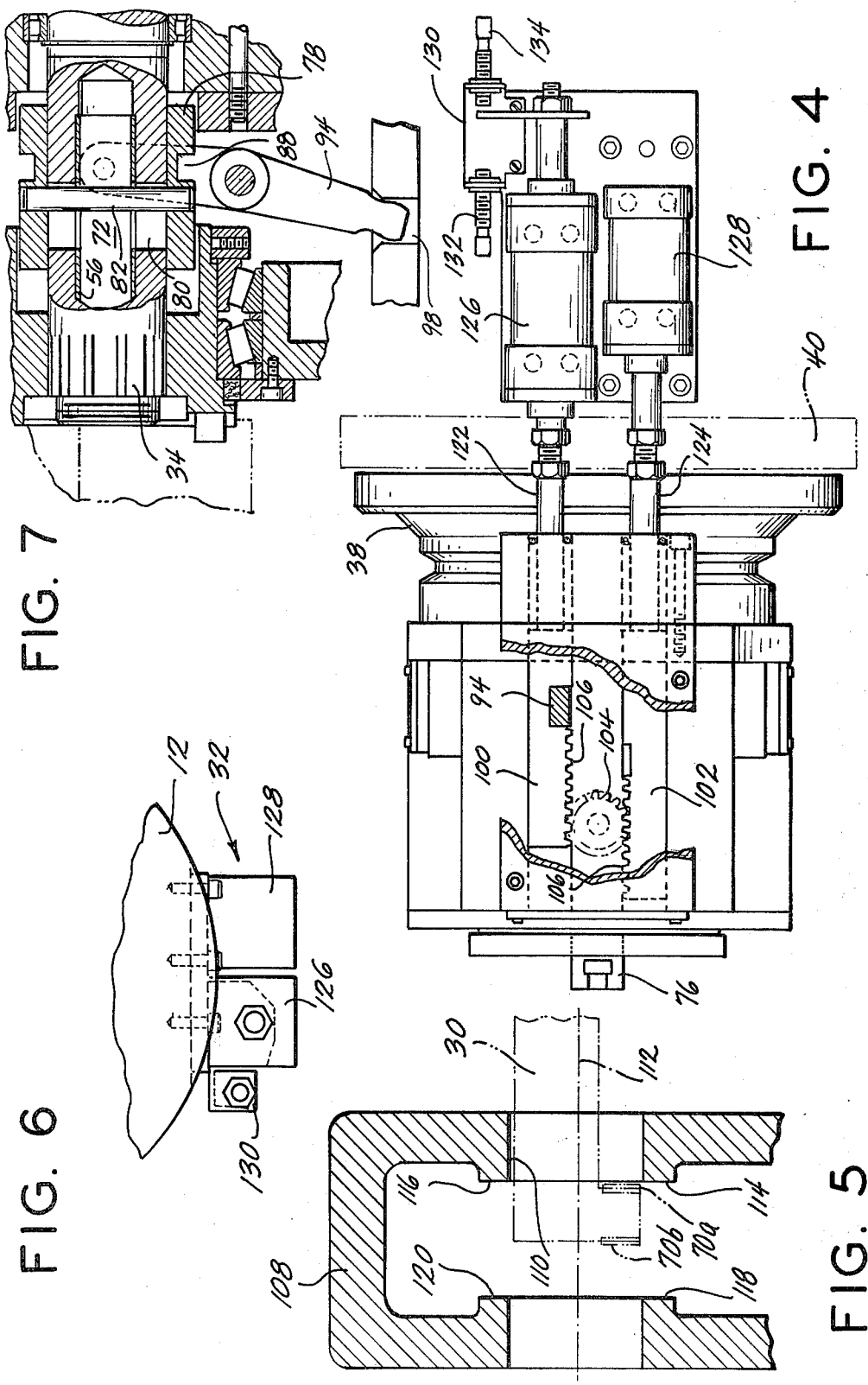

CONTROLLABLE TOOL FEEDING APPARATUS

BACKGROUND OF THE INVENTION

The invention disclosed and claimed herein generally pertains to head apparatus which is mountable upon the spindlehead of a machine tool or machining center, and which enables a cutting tool to be transversely fed or outwardly fed at a closely controlled feedrate. More particularly, the invention pertains to apparatus of the above type which is attachable to and detachable from a machine spindlehead which is capable of driving a number of different tools. Even more particularly, the invention pertains to apparatus of the above type which may be stored in a tool storage facility of a machining center, and which may be routinely transferred between the tool storage facility and a machine spindlehead by means of a conventional automatic tool changing system.

In order to operate certain types of spindle driven cutting tools, it is necessary to reciprocate an actuating element contained in the tool, as the tool is rotated by the spindle. As the actuating element is moved, the cutting element of the tool is moved transversely to the spindle axis (cross fed) or is moved along the spindle axis (outwardly fed). Examples of tools which are operated in such manner include grooving tools, cross-feed facing tools, and feed-out boring tools.

Techniques and structure for operating the above types of tools are, of course, well known in the art. In some techniques, an attachment upon which the tool is mounted is placed upon the spindle and a mechanism within the attachment is driven by the spindle to feed the tool. In other techniques, a draw rod is provided which coaxially traverses the spindle, and engages and reciprocates the actuating element of a cutting tool. However, if some of such tool feeding techniques are employed, certain disadvantages or limitations may be encountered. For example, if the spindlehead of a machine is adapted to drive feedable tools in accordance with certain prior art techniques, it may be unable to drive tools which require only rotary motion. A number of manual tasks may have to be performed to adapt the machine to operate nonfeedable tools, whereby machine flexibility is significantly reduced.

The present invention provides a feeding head for a machine tool or machining center which is capable of controllably driving both cross-feed and feed-out tools. The feeding head may be readily attached to and detached from a driving spindle by means of a conventional automatic tool changing system, whereby the driving spindle may be rapidly adapted to operate both feedable and non-feedable tools. The rate at which the feeding head feeds a tool may be closely controlled, yet is completely independent of the revolution rate of the driving spindle.

BRIEF SUMMARY OF THE INVENTION

The present invention provides apparatus for feedably driving a selected cutting tool, the apparatus including a shaft means which is joinable to a machine spindle of a machine spindlehead for coupling rotary driving motion to the selected tool from the machine spindle, the shaft means being provided with a bore. A rod means is mounted in the bore for engaging the selected tool, as well as for selectively feeding the tool, and means coupled to the rod means controllably reciprocates the rod means within the bore. Means immovably fixed to the machine spindlehead drives the rod reciprocating means to cause the rod means to feed the selected tool at a prespecified rate, and structure supporting the shaft means and the rod reciprocating means enables an automatic tool changer to, upon command, join the shaft means to the machine spindle and to place the rod reciprocating means and the driving means in operative relationship.

Preferably, the rod reciprocating means comprises a spool positioned around the shaft means in coaxial relationship therewith, means for securing the spool and the rod means in immovable relationship, the securing means enabling the spool and the rod to rotate with the shaft means, and actuating means for controllably moving the spool and the rod means in longitudinal relationship with the shaft means. The actuating means preferably comprises a lever means having first and second ends, the lever means being pivotable about a pivot point which is located within the supporting structure, means for controllably pivoting the lever means, and means for linking an end of the lever means to the spool, whereby the lever means moves the spool and rod means in longitudinal relationship with the shaft means when the lever means is pivoted about the pivot point.

In a preferred embodiment of the invention, the driving means comprises a hydraulic cylinder means for selectively reciprocating first and second cylinder rods, which in turn drive first and second actuating bars to pivot the lever means. The lever means comprises a yoke lever which is provided with first and second forks having end portions, the spool being positioned between the end portions and being joined thereto by means which do not impede spool rotation.

OBJECTS OF THE INVENTION

An object of the present invention is to provide a system for quickly adapting a spindle of a machine tool or machining center to drive a cutting tool which must either be fed across or fed into a workpiece as the tool is rotated by the spindle.

Another object is to provide a system for more closely controlling the rate at which a feedable cutting tool is fed across or fed into a workpiece.

Another object is to provide additional flexibility or versatility in a machining center which is provided with an automatic tool changing system, and which performs a sequence of machining operations under the direction of an automatic control.

Another object is to provide a single feeding head, or like attachment, which may be placed upon and removed from a spindle by means of an automatic tool changer, and which is capable of driving either a transverse feed or an outward feed tool, according to the type of tool which is mounted thereupon.

These and other important objects and features of the invention will become more readily apparent by considering the following Detailed Description of the Preferred Embodiment, together with its accompanying drawings.

BRIEF DESCRIPTION OF THE DRAWINGS

FIG. 4 is a view of the underside of the embodiment of FIG. 1, a section thereof being broken away.

FIG. 5 is a sectional view showing a portion of a feedable cutting tool which may be employed by the embodiment of FIG. 1, together with a portion of a workpiece which is to be machined by the tool.

FIG. 6 is a view showing the attachment of a control device to the spindlehead of the machining center of FIG. 1.

FIG. 7 is a sectional view showing principal components of the embodiment of FIG. 1.

DETAILED DESCRIPTION OF THE PREFERRED EMBODIMENT

Figure 1:
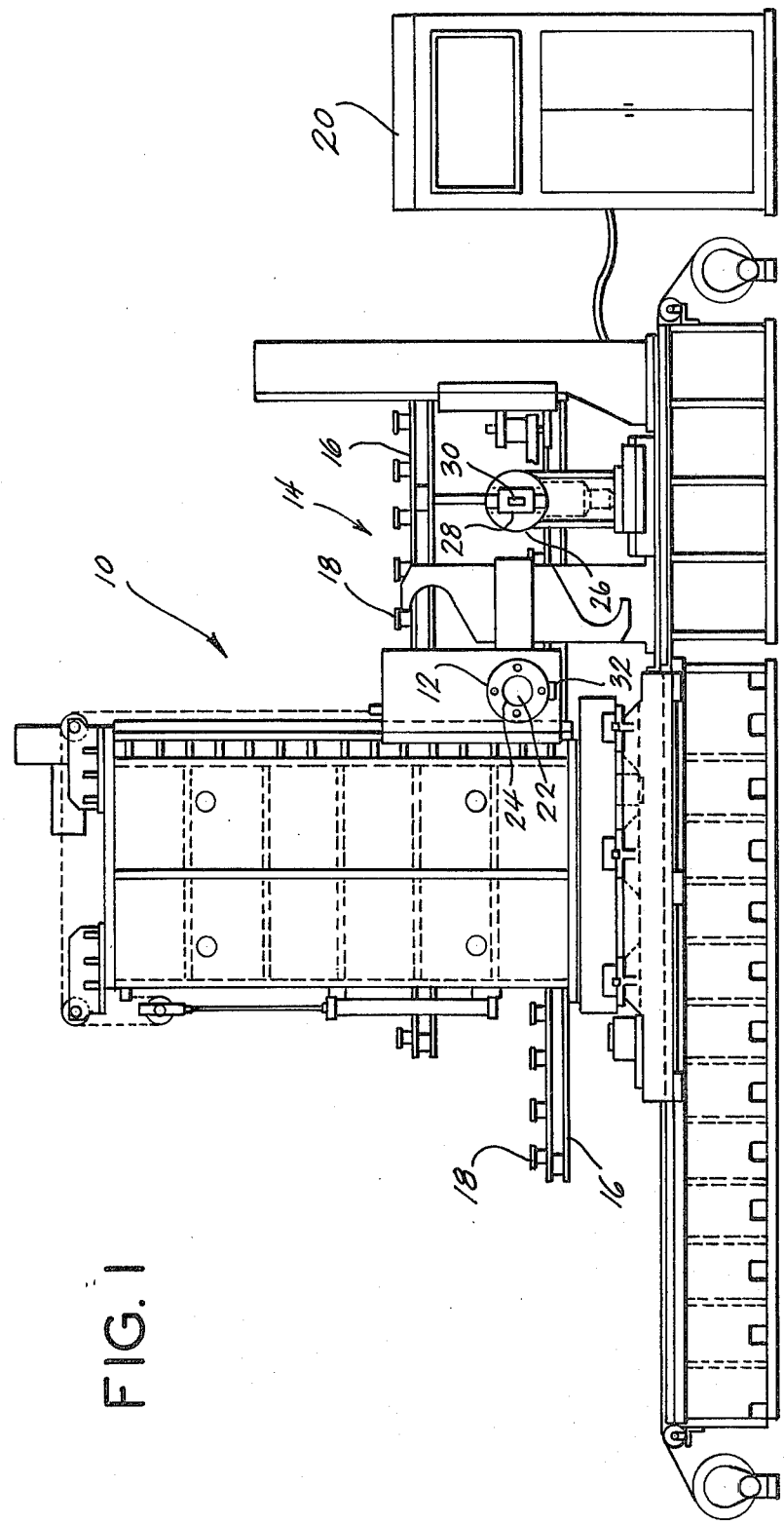
FIG. 1 is an elevational view showing an embodiment of the invention employed in a machining center.

Referring to FIG. 1, there is shown a machining center 10 provided with a machine spindlehead 12, a tool changing system 14, and a tool storage magazine 16, an array of cutting tools 18 being removably contained or stored in the magazine. An automatic control, such as a computer control 20, is provided to direct respective components of machining center 10 in coordinated activity, over a period of time, to perform a specified sequence of machining operations upon a workpiece (not shown in FIG. 1).

To perform a particular operation, two consecutive cycles may be executed by machining center 10, a tool change cycle, followed by a cutting cycle. During a tool change cycle, system 14 removes or extracts the tool used in the preceding operation from the collet 22 of a machine spindle 24, which is journaled in machine spindlehead 12, and places the removed tool in magazine 16. Also, during the tool change cycle, system 14 selects a tool 18 from magazine 16 which is capable of performing the particular operation, and inserts the shank of the selected tool into collet 22. Machining center 10 is then directed by control 20 to tighten collet 22 so that the selected tool is locked into spindle 24, and may be driven thereby. When the selected tool has been placed into spindle 24, certain components of machining center 10 may be selectively displaced, in response to signals from control 20, to achieve a specified initial alignment or orientation between the selected tool and the workpiece on which the particular operation is to be performed. Thereupon, the cutting cycle is commenced, during which machine spindle 24 is activated to drive the selected tool against the workpiece.

Referring further to FIG. 1, there is shown a tool feeding head 26, structured in accordance with the principles of the present invention, which is adapted for storage in magazine 16 along with various tools 18. Head 26 is further adapted to enable tool changing system 14 to transport head 26 between magazine 16 and spindlehead 12, and to place it upon and remove it from spindlehead 12, all of such operations being performed under the commands of automatic control 20. FIG. 1 shows head 26 being transported from magazine 16 to spindlehead 12, and further shows a transverse or cross feed cutting tool 28 mounted upon tool feeding head 26. When head 26 is operatively joined to spindlehead 12, as hereinafter described, operation of spindle 24 drives head 26 to feed a cutting element 30 of tool 28 transversely to the axis of spindle 24. The rate of feed of element 30 may be regulated by means of a control device 32 mounted on spindlehead 12, control device 32 engaging an actuating component of head 26 when head 26 is placed upon spindlehead 12.

It is anticipated that a tool feeding head 26 and a control device 32 structured in accordance with the present invention may be readily adapted for employment with a number of different commercially available machining centers, and may interact with different types of components of such centers. Usefully, machining center 10 comprises one of the MODU-LINE machining centers which are manufactured and sold by the Kearney & Trecker Corporation, spindlehead 12, tool changing system 14, magazine 16 and control 20, respectively, comprising components which are standard in such centers. It is to be noted that "MODU-LINE" is a registered trademark owned by the Kearney & Trecker Corporation.

Figure 2:
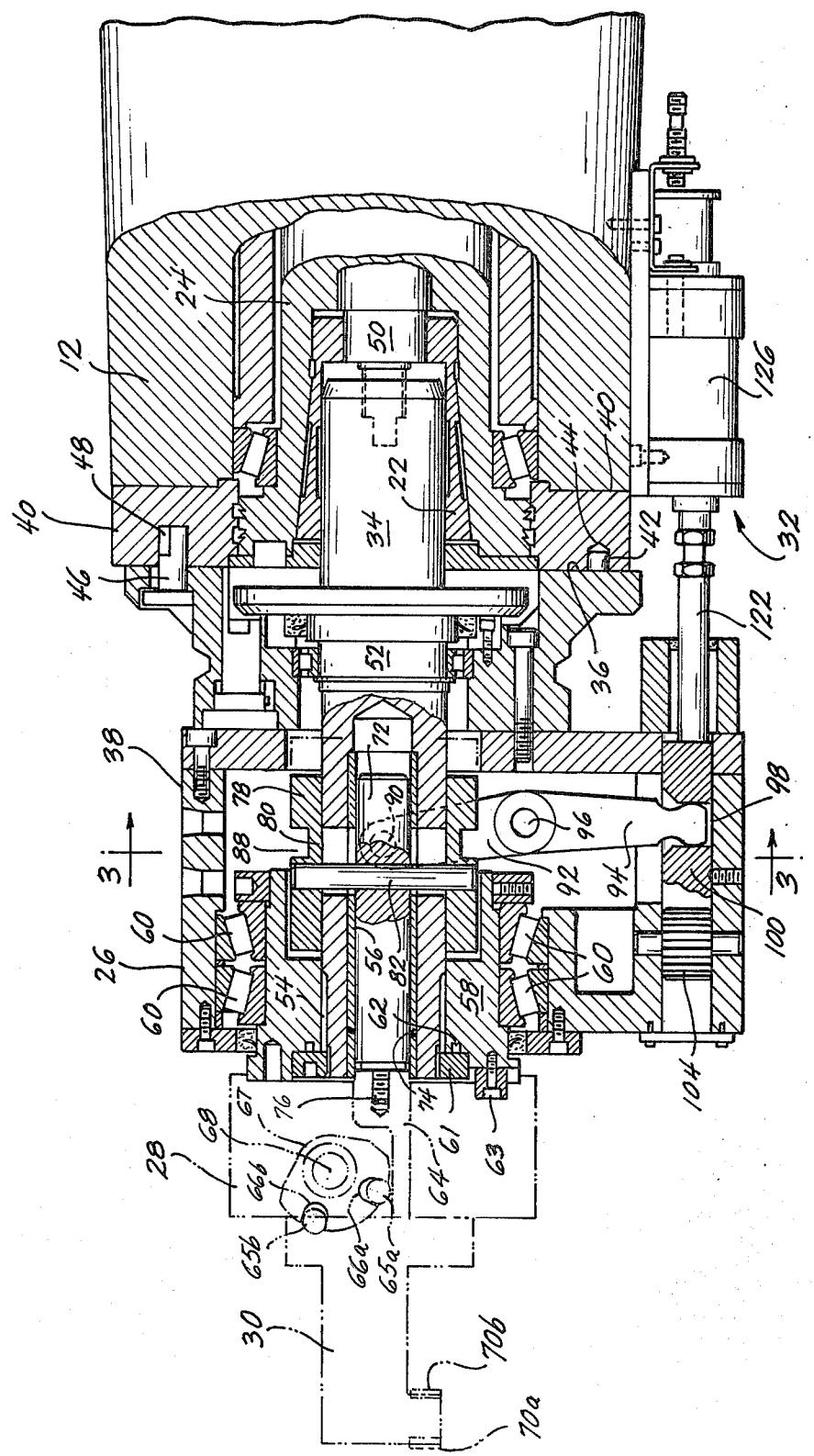
FIG. 2 is a sectional view of the embodiment of FIG. 1, showing such embodiment placed upon the machine spindlehead of the machining center of FIG. 1.

Referring to FIG. 2, there is shown tool feeding head 26 provided with a shaft 34, the rearward end of shaft 34 being receivable into collet 22 of machine spindle 24. To place feeding head 26 upon machine spindlehead 12, control 20 signals tool changing system 14 to draw head 26 out of magazine 16, and to initially position it so that a seating surface 36 of housing 38 of feeding head 26 is in close, spaced-apart relationship with spindle nose 40 of spindlehead 12, the rearward end of shaft 34 being partially inserted into collet 22 and a locator pin 42 on seating surface 36 engaging a locator pin receptacle 44, sunk into spindle nose 40. Four bayonet lock pins 46, which are spaced around seating surface 36, are thereupon brought into alignment with corresponding bayonet lock receptacles 48, which are provided in spindle nose 40. A draw rod 50, coaxial with spindle 24 and moving along the axis thereof, engages the rearward end of shaft 34 and draws shaft 34 and housing 38 toward spindlehead 12. Thereupon, seating surface 36 is brought into tight, abutting relationship with spindle nose 40, each bayonet lock pin 46 is inserted and locked into a receptacle 48, and the rearward end of shaft 34 is more fully inserted into collet 22. Collet 22 is then tightened to lock shaft in immovable relationship with spindle 24.

Referring further to FIG. 2, there is shown shaft 34 rotatably supported, or journaled, in a bearing 52 contained in housing 38. The forward end of shaft 34 is provided with splines 54, and is further provided with a bore 56 centered along the axis of shaft 34. Splines 54 engage a tool spindle 58, which is rotatably supported in housing 38 by bearings 60, and which is locked in immovable relationship with shaft 34 by means of a ring nut 61. Tool spindle 58 is thereby constrained to rotate with shaft 34 and spindle 24. In order to avoid increasing the load on bearings 60 when shaft 34 is drawn into collet 22, an "O"-ring 62 is positioned between nut 61 and tool spindle 58, the "O"-ring providing shaft 34 with a specified amount of end float, such as 0.015".

Tool spindle 58 is adapted to receive and to operatively mount a feedable cutting tool, such as tool 28, tool 28 being joined to the spindle 58 by means of machine bolts 63 or the like. Tool 28 is provided with an actuating element 64, which is constrained to move along the axis of a spindle to which the tool is joined. A pin 65a is attached to actuating element 64, and is received into a groove 66a of a structure 67, which is pivotable about a point 68. Movement of element 64 along the spindle axis therefore causes pivoting movement of structure 67. By providing structure 67 with a second groove 66b, for receiving a pin 65b attached to cutting element 30 of tool 28, movement of actuating element 64 will cause cutting element 30 to be correspondingly moved, in a direction which is transverse to the spindle axis. Cutting element 30 may, therefore, be controllably moved or fed across a workpiece, as it is rotated in an orbit by spindle 58, by controllably moving actuating element 64.

While FIG. 2 shows a tool 28 which is provided with a particularly configured cutting element 30, mounting double cutting bits 70a and 70b, it is anticipated that tool feeding head 26 shown in FIG. 2 could be readily employed to controllably drive a number of other types of transverse feed cutting tools, as well as outward feed cutting tools, without being restructured in any way. Head 26 could, therefore, be used with a driving spindle to perform a great diversity of machining operations of the type which requires the use of feedable tools. In one mode of operation, tool changing system 14 could be adapted to attach a feedable tool to a head 26 after the feeding head had been mounted upon machine spindlehead 12, as previously described. In another mode, several heads 26 could be stored in magazine 16, each head mounting a different feedable tool, whereby tool change operations would be minimized.

In order to closely control the rate at which cutting element 30 is fed across or into a workpiece, an actuating rod 72 is mounted in bore 56 of shaft 34, upon bearins 74. Rod 72 is thereby disposed to reciprocate inward to and outward from bore 56, along the axis of shaft 34. A bolt or other device 76 is provided at the forward end of rod 72, so that rod 72 may fixably engage actuating element 64 of tool 28. The feedrate of tool 28 may, therefore, be controlled by regulating the reciprocation of rod 72.

Referring yet again to FIG. 2, there is shown a spool 78 placed around shaft 34, in coaxial relationship therewith, spool 78 being disposed to move back and forth along shaft 34, that is, in longitudinal relationship with the shaft. A narrow slot 80 passes through shaft 34, the slot being sized in relation to a pin 82 passing through the slot so that the pin is able to easily move along the length of slot 80, but is prevented from moving laterally or sideways within the slot. The slot is oriented in relation to shaft 34 so that pin 82 is enables to move in longitudinal relationship therewith, pin 82 being employed to join rod 72 and spool 78 in immovable relationship. It follows that rod 72, spool 78 and pin 82 are all constrained to rotate with shaft 34. At the same time, all of such elements may move longitudinally with respect to the shaft, to an extend determined by the length of slot 80. It will be readily apparent from the above that the reciprocation of actuating rod 72, and, therefore, the feeding rate of tool 28, may be regulated by regulating the longitudinal movement of spool 78 with respect to shaft 34.

Figure 3:
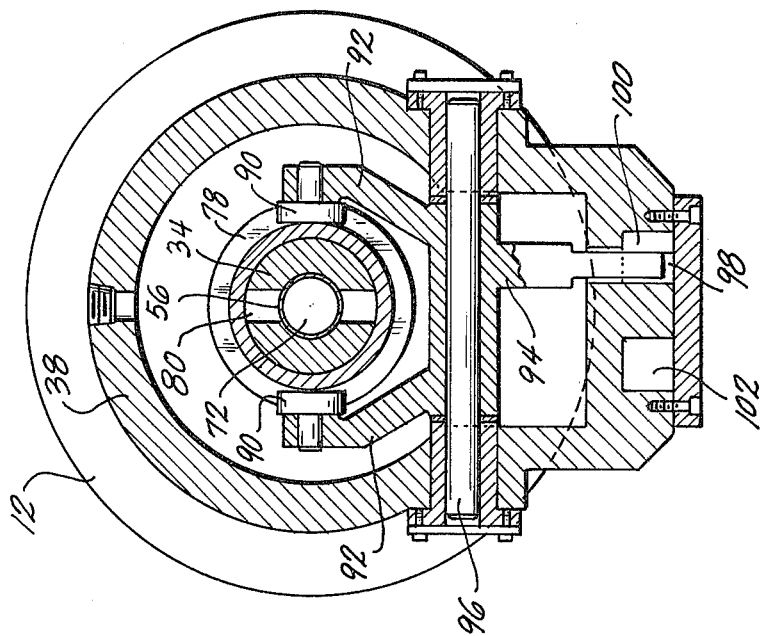
FIG. 3 is a sectional view taken along lines 3—3 of FIG. 2.

Referring to FIGS. 2 and 3 together, there is shown a groove 88 circumscribed around spool 78, a pair of bearings 90 being fitted into the groove. Each bearing 90 is pivotally joined to the end portion of one of the forks 92 of yoke lever 94, which is pivotable about a pin 96 mounted in housing 38. Bearings 90 do not impede rotation of spool 78. However, they do link the spool to yoke lever 94 so that when the lever is pivoted, spool 78 and rod 72 are moved longitudinally in relation to shaft 34. To provide for controlled pivoted motion of lever 94, the lower end thereof is fitted into a slot 98, which is provided in an actuating bar 100.

Referring to FIGS. 2 and 4 together, there is shown actuating bar 100 positioned in closely spaced parallel relationship with an actuating bar 102, both bars being constrained by suitable means to move forwardly and backwardly within housing 38, that is, to move away from and toward spindle nose 40. A pinion 104 is journaled between the forward ends of bars 100 and 102, each bar being provided with rack teeth 106 which engage pinion 104, on opposite sides thereof. Consequently, a forward movement of one of the actuating bars must be accompanied by an equivalent backward movement of the other actuating bar.

Referring to FIG. 5, there is shown cutting element 30 of tool 28 aligned in an initial relationship with a workpiece 108, prior to the commencement of a cutting cycle of machining center 10. Alignment is achieved, as aforementioned, by selectively displacing certain components of machining center 10, under the direction of control 20. In the initial alignment, cutting element 30 is inserted through a bore 110 of workpiece 108. When the cutting cycle commences, cutting element 30 is rotated by rotary motion of drive spindle 24, which is coupled to tool 28 through shaft 34 and tool spindle 58. At the same time, cutting element 30 of tool 28 is caused to move, in response to operation of actuating rod 72, transversely to an axis 112, the axis of machine spindle 24, shaft 34 and tool spindle 58. Such transverse movement brings cutting bit 70a into cutting relationship with a face 114 of workpiece 108, enabling bit 70a to trim or mill face 114 as bit 70a is moved thereacross.

When a desired cutting operation on face 114 has been completed, actuating rod 72 is reciprocated in the opposite direction and cutting element 30 is returned to the initial alignment. Thereafter, during successive cutting cycles, element 30 may be transversely or outwardly fed, as required to enable cutting bit 70a to mill face 116 of workpiece 108, and to enable bit 70b to mill faces 118 and 120 thereof.

Referring once more to FIGS. 2 and 4 together, there are shown cylinder rods 122 and 124, respectively engaging actuating bars 100 and 102, and respectively disposed to reciprocate into and out of hydraulic cylinders 126 and 128. A fluid flow control 130, operable under commands from control 20, synchronously moves hydraulic fluid into and out of cylinders 126 and 128 so that fluid is allowed to flow out of one cylinder as it is being pumped into the other cylinder. Consequently, to move actuating rod 72 outward from bore 56, fluid is pumped into cylinder 128, so that rod 124 drives actuating bar 102 forward. The corresponding backward movement of bar 100, which takes place because of pinion 104 as aforementioned, moves rod 122 into cylinder 126, from which the fluid is being concurrently withdrawn. The backward movement of bar 100 turns lever 94 in a counter clockwise direction, moving actuating rod 72 forward. To move rod 72 in the opposite direction, fluid is moved into cylinder 126, concurrent with fluid withdrawal from cylinder 128. It will be readily apparent that by making the operation of flow control 130 closely responsive to directions from control 20, control 20 is enabled to closely regulate the rate at which a cutting bit 70a or 70b is fed into a workpiece. Cylinders 126 and 128, rods 122 and 124, and flow control 130 together comprise control device 32, which is immovably mounted upon spindlehead 12.

Referring further to FIG. 4, there are shown proximity switches 132 and 134 coupled to fluid flow control 130, which respectively indicate the full depth and full retract positions of actuating rod 72.

Referring to FIG. 6, there are shown hydraulic cylinders 126 and 128 and fluid flow control 130 immovably joined to spindlehead 12. Cylinders 126 and 128 are oriented upon spindlehead 12 so that actuating bars 100 and 102, respectively, engage cylinder rods 122 and 124, in the aforedescribed manner, when head 26 is mounted upon spindle nose 40 in operating relationship.

Referring to FIG. 7, there is shown lever 94 pivoted so that actuating rod 72 is in a fully retracted position within bore 56.

Figure 8:
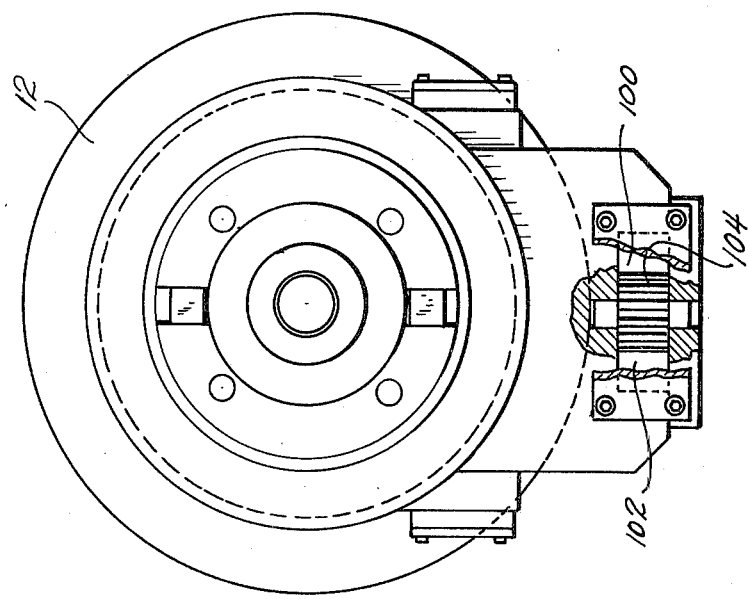
FIG. 8 is a frontal view of the embodiment of FIG. 1.

Referring to FIG. 8, there is shown head 26 mounted upon machine spindlehead 12, tool 28 being removed from head 26.

It is anticipated that modifications of the above embodiment, as well as other embodiments of the invention, will occur to those of skill in the art. It is the intent of the Applicant to include all of such modifications and embodiments which fall within the scope of his invention, as hereinafter claimed, within the bounds of patent protection arising out of this application.

What is claimed is:

1. A tool head apparatus including a tool head adapted to be removably mounted on a machine tool having a rotary spindle; a cutting tool supported by said tool head for movement in a rectilinear path transverse to the axis of rotation of the spindle; means locking said tool head to the machine tool in a predetermined angular position; means coupling said cutting tool to the machine tool spindle when the tool head is mounted on the machine tool so that said cutting tool rotates with the spindle; moving means connected to said cutting tool and operable when actuated to move said cutting tool in its path of travel in either direction; an actuator rod slidably supported in the tool head for rectilinear movement and coupled to said moving means so that the rectilinear movement of said actuator rod serves to actuate said moving means; a lever pivotally supported in said tool head and coupled to said actuator rod so that pivotal movement of said lever will produce rectilinear movement of said actuator rod; a bar slidably supported in the tool head for rectilinear movement; means coupling said bar to said lever so that rectilinear movement of said bar produces a pivotal movement of said lever; a piston and cylinder mechanism mounted on the exterior of the machine in position to be engaged by said bar when the tool head is mounted on the machine tool in the predetermined angular position for actuating said bar to adjust the position of the cutting tool.

* * * * *